United States Patent
Kawashima et al.

(10) Patent No.: US 8,213,284 B2
(45) Date of Patent: Jul. 3, 2012

(54) MULTI-LAYERED REWRITABLE OPTICAL DISC RECORDING APPARATUS AND RECORDING METHOD

(75) Inventors: Tetsuji Kawashima, Kanagawa (JP); Yukio Shishido, Kanagawa (JP); Yoshiyuki Tokumoto, Kanagawa (JP); Toru Ifuku, Tokyo (JP); Hiroshi Naganuma, Kanagawa (JP); Kiyoshi Arai, Kanagawa (JP); Hideho Maeda, Tokyo (JP)

(73) Assignee: Sony Corporation, Tokyo (JP)

( * ) Notice: Subject to any disclaimer, the term of this patent is extended or adjusted under 35 U.S.C. 154(b) by 732 days.

(21) Appl. No.: 11/434,883

(22) Filed: May 17, 2006

(65) Prior Publication Data
US 2006/0274626 A1 Dec. 7, 2006

(30) Foreign Application Priority Data
Jun. 1, 2005 (JP) ................................. 2005-161429

(51) Int. Cl.
*G11B 7/00* (2006.01)
(52) U.S. Cl. ...................................... 369/59.25; 369/94

(58) Field of Classification Search ................. 369/59.25
See application file for complete search history.

(56) References Cited

U.S. PATENT DOCUMENTS

| 7,164,640 B2* | 1/2007 | Sasaki ........................... 369/53.2 |
| 7,227,831 B2* | 6/2007 | Tokumoto ................... 369/275.1 |
| 2002/0191505 A1* | 12/2002 | Horibata et al. .............. 369/47.3 |
| 2005/0025015 A1* | 2/2005 | Horibata ....................... 369/53.3 |
| 2006/0230325 A1* | 10/2006 | Motohashi .................... 714/710 |

FOREIGN PATENT DOCUMENTS

| JP | 2005-93032 | 4/2005 |
| JP | 2006-294221 | 10/2006 |

* cited by examiner

*Primary Examiner* — LaTanya Bibbins
(74) *Attorney, Agent, or Firm* — Oblon, Spivak, McClelland, Maier & Neustadt, L.L.P.

(57) ABSTRACT

A recording apparatus performs recording on an optical disc recording medium which has a plurality of recording layers and is capable of having data rewritten thereon. The recording apparatus includes recording means for performing data recording on each recording layer of the recording medium and recording controlling means for controlling the recording means so that, among the plurality of recording layers, recording of dummy data is performed preferentially starting from a recording layer intended for the final user data recording operation.

8 Claims, 6 Drawing Sheets

| LAYER 1 | LEAD-OUT | | | | | | |
|---|---|---|---|---|---|---|---|
| LAYER 0 | LEAD-IN | UD1 | BF1 | BF2 | BF3 | | |

| LAYER 1 | LEAD-OUT | | | |
|---|---|---|---|---|
| LAYER 0 | LEAD-IN | UD1 | UD2 | |

| LAYER 1 | LEAD-OUT | F-NEW | | |
|---|---|---|---|---|
| LAYER 0 | LEAD-IN | UD1 | UD2 | |

TEMPORARY MIDDLE AREA

TEMPORARY MIDDLE AREA

FIG. 8
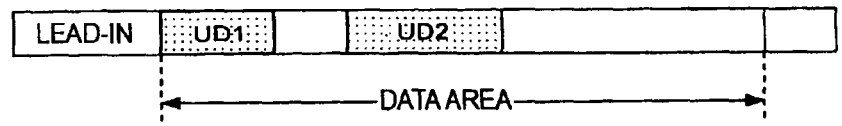
FIG. 9
BACKGROUND ART
FIG. 10A
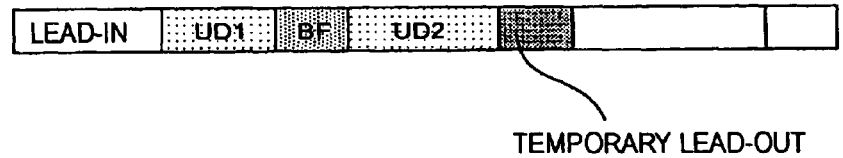
BACKGROUND ART
FIG. 10B
TEMPORARY LEAD-OUT
BACKGROUND ART

TEMPORARY MIDDLE AREA

MULTI-LAYERED REWRITABLE OPTICAL DISC RECORDING APPARATUS AND RECORDING METHOD

CROSS REFERENCES TO RELATED APPLICATIONS

The present invention contains subject matter related to Japanese Patent Application JP 2005-161429 filed in the Japanese Patent Office on Jun. 1, 2005, the entire contents of which are incorporated herein by reference.

BACKGROUND OF THE INVENTION

1. Field of the Invention

The present invention relates to a recording apparatus for performing recording on an optical disc recording medium which has a plurality of recording layers and is capable of having data rewritten thereon. The present invention also relates to a recording method for the recording apparatus.

2. Description of the Related Art

Optical disc recording media are known examples of optical recording media capable of having information optically recorded thereon and reproduced therefrom.

As an example of such recording media, DVDs (Digital Versatile Discs) are widely used. Types of existing DVDs include reproduction-only DVD-ROMs on which information is recorded in the form of combinations of embossed pits and lands, DVD-Rs or DVD+Rs in which dye-change films are used for the recording layers, which permits recording to be performed only one time, and DVD-RWs or DVD+RWs in which phase-change films are used for the recording layers, thereby allowing rewriting of data.

Among the above DVDS, DVD+RWS, as a type of rewritable medium, were developed later than DVD-RWs which are also a type of rewritable medium. Therefore, DVD+RWs are provided with increased user operability compared with DVD-RWs.

For example, for DVD+RWs, an arrangement is employed which enables reduction of time necessary for disc formatting.

A rewritable disc such as a DVD+RW disc is configured to undergo a so-called formatting process so as to be usable in a reproduction-only apparatus. In such a formatting process, an unrecorded part of a data area intended for recording of user data is filled with dummy data such as all 0 data.

For some types of discs, such a formatting process for ensuring compatibility with reproduction apparatuses is performed on the entire disc prior to recording of user data. In contrast, DVD+RW discs are configured to allow user data recording to be started without disc formatting, which reduces preparation time for recording. In this case, disc formatting for an unrecorded part is configured to proceed automatically while no writing or reading operation is being performed in a drive (idling state). Thus, the formatting process progresses in the background, enabling reduction of user waiting time and thus enhancing operability. Such a formatting technique described above is called background formatting.

For a DVD+RW disc, the entire disc is not to be formatted immediately after disc loading. Therefore, there may be a case where the disc, in which only a part of its data area is recorded with user data, is requested before formatting of the entire disc is not completed.

When such a recorded disc which is partially formatted is ejected, a temporary lead-out is added at the end of a region recorded with the user data. This operation ensures compatibility with a reproduction-only apparatus.

Thus, providing a lead-out area in a data area enables reproduction of the recorded user data in a reproduction-only apparatus. Since such a lead-out area is temporary, recording of user data can be restarted by erasing the lead-out area when the disc is loaded again.

Such background formatting performed for a DVD+RW disc in connection with addition of temporary lead-out will be described with reference to FIG. 9, FIG. 10A and FIG. 10B.

Each of these figures illustrates an area structure of a disc. As shown in the figures, a lead-in area is located at the innermost radius of the disc, followed by a data area intended for user data recording which is located at the outer radius side of the lead-in area.

Referring now to FIG. 9, a condition of the disc is illustrated by way of example, in which a data file has been recorded. When such a data file is recorded on the disc, it is highly likely that the data file is recorded in the form of user data blocks (UDs) which are recorded intermittently in the data area as shown in FIG. 9. Particularly in a case where a UDF (Universal Disc Format) is used for the disc, the recording operation is carried out in such a manner that file management information is recorded as a user data block UD 1 at the innermost radius side of the data area which immediately follows the lead-in area. In this operation, a data file of actual data is not necessarily recorded at the region adjacent to the region where the file management information is recorded. Therefore, it is highly likely that the user data block UD 1 recorded at the innermost radius of the data area and user data UD 2 which serves as the actual data are recorded having a space therebetween.

In this condition in which data blocks have been intermittently recorded, the data area contains an unrecorded part and is not provided with a lead-out area. This leaves the disc incompatible with reproduction-only apparatuses.

Referring to FIG. 10A, the background formatting technique described above will be described. In a background formatting process, recording of dummy data is performed in units of predetermined recording blocks BFs sequentially from the innermost radius side of the data area toward the outer radius side, in accordance with the sequence in which user data is recorded.

Now, it is assumed, as shown in FIG. 10A, that background formatting has been carried out sequentially from a block BF 1, located at innermost radius side of the data area, through a block BF 5. Then, recording of a data file is performed similarly to the case illustrated in FIG. 9, in which the user data block UD 1 and the user data block UD 2 are recorded in the data area.

This brings about a condition where, as shown in FIG. 10B, a dummy data block is recorded in the region between the user data blocks UD 1 and UD 2, since the background formatting has been carried out. Under this condition, when a request for disc ejection accompanied by a request for the disc to be made compatible with reproduction-only apparatuses is made, a temporary lead-out is provided at the outer radius region subsequent to the end of the user data block UD 2, i.e., the end position of the user data-recorded region in the data area. This operation facilitates fast disc ejection.

As can be found from the foregoing, performing the background formatting can eliminate or reduce the portion in which dummy data is to be recorded when the disc is ejected. This therefore shortens user waiting time for disc ejection.

Currently, a type of DVD+RW disc which has only one recording layer has been introduced. However, an attempt has been made to develop a multilayered DVD+RW disc, similarly to other types of medium such as a DVD-ROM disc, and a DVD-R or DVD+R disc.

Japanese Unexamined Patent Application Publication No. 1999-167725 discloses a technique for providing a DVD-ROM disc having multiple recording layers. In Japanese Unexamined Patent Application Publication No. 1999-134799, a technique is discussed in which background formatting is performed on a rewritable optical disc recording medium.

SUMMARY OF THE INVENTION

Now, it is assumed that a multilayered DVD+RW disc were provided. Then, using FIG. 11 and FIG. 12, an operation procedure will be described which may be performed when the known background formatting technique described above is applied to the multilayered DVD+RW disc.

FIG. 11 illustrates an area structure of the disc having multiple recording layers. In this description, a case is illustrated where the disc has two recording layers and where a so-called opposite track path is used for the disc. More specifically, for a first recording layer (layer 0) which is positioned on the side closer to an objective lens in a recording apparatus, recording of user data is performed sequentially from the inner radius side to the outer radius side. In contrast, for a second recording layer (layer 1) positioned on the side farther from the objective lens, recording is performed from the outer radius side to the inner radius side.

When the known background formatting technique is used for such a dual-layer disc, recording of dummy data is carried out in units of blocks BFs sequentially from the inner radius side of the first recording layer as shown in FIG. 11, which is in accordance with the sequence of user data recording.

Now, it is assumed that, similarly to the case shown in FIG. 10A, background formatting has been carried out sequentially from the block BF 1 to the block BF 5, and then the user data block UD 1 and the user data block UD 2 are recorded.

The resulting condition in the data area of the disc is illustrated in FIG. 12A. Specifically, the region between the user data block UD 1 and the user data block UD 2 has already been formatted, similarly to the case illustrated in FIG. 10B. Therefore, no further formatting is necessary for the first recording layer, when a request for the disc to be made compatible with reproduction-only apparatuses is made.

In response to the request, a temporary middle area is added as a guard area at the outer radius side of the interlayer transition portion.

However, since the disc in this example has multiple recording layers, simply providing such a temporary middle area is unsatisfactory in order to provide the disc compatibility with reproduction-only apparatuses. To achieve compatibility, it is necessary that any data be recorded on every recording layer, in the regions in the data areas radially less distant than the end of a recorded user data block UD in the first recording layer.

More specifically, in this case, to comply with the ejection request, dummy data has to be recorded also on the second recording layer for the region, as shown in FIG. 12B as F-new, which is located a position radially less distant than the end of the user data block UD 2 recorded on the first recording layer.

Thus, the known background formatting technique may be employed for a multilayered disc, in which recording of dummy data is performed sequentially from the inner radius side of the first recording layer. However, as can be seen from the example described above, dummy data recording in this case is performed at the end of a recording session, on the recording layer on which the final recording operation of user data is intended to be performed.

In other words, when the known background formatting technique is applied to a multilayered disc, formatting of the recording layer which is intended for the final user data recording operation is configured to be carried out at the end of a recording session. This consequently increases the time necessary for disc ejection, due to the formatting operation performed for the recording layer intended for the final recording of user data.

In the above example, the case is illustrated where an opposite track path is used for the disc. However, also in a case where a parallel track path is used, in which data is recorded in the same direction in every recording layer, a similar problem arises in performing the known background formatting process that follows the sequence of user data recording.

The present invention has been made in view of the foregoing circumstance. Accordingly, there is a need for a recording apparatus having a configuration described below.

The recording apparatus according to an embodiment of the present invention performs recording on an optical disc recording medium which has a plurality of recording layers and is capable of having data rewritten thereon. Thus, the recording apparatus is provided with recording means which carries out data recording on each recording layer of the recording medium.

In addition to this, the recording apparatus according to an embodiment of the present invention is provided with recording controlling means which controls the recording means so that recording of dummy data is performed preferentially starting from a recording layer intended for the final recording of user data.

In the recording apparatus according to an embodiment of the present invention, as mentioned above, recording of dummy data is performed preferentially starting from the recording layer intended for the final user data recording operation. Therefore, compared with a known background formatting technique, a larger formatted area can be obtained in the recording layer intended for the final recording operation, when ejection of the optical disc recording medium is requested.

Thus, the recording apparatus according to an embodiment of the present invention can reduce a data area to be formatted when an optical disc recording medium is ejected, since recording of dummy data is performed preferentially from the recording layer intended for the final user data recording operation.

Consequently, according to the present invention, formatting time necessary for ejection of an optical disc recording medium having multiple layers can be shortened.

BRIEF DESCRIPTION OF THE DRAWINGS

FIG. 5 also illustrates an operation performed when a known background formatting technique is applied to a multilayered disc;

FIG. 7 also illustrates an operation performed when a background formatting technique according to an embodiment of the present invention is employed;

FIG. 8 illustrates a modification of an embodiment of the present invention;

FIG. 9 illustrates a state in which user data is recorded on a disc;

FIG. 10 illustrates a known background formatting technique;

DESCRIPTION OF THE PREFERRED EMBODIMENTS

In the following, preferred embodiments of the present invention will be described.

Figure 1:
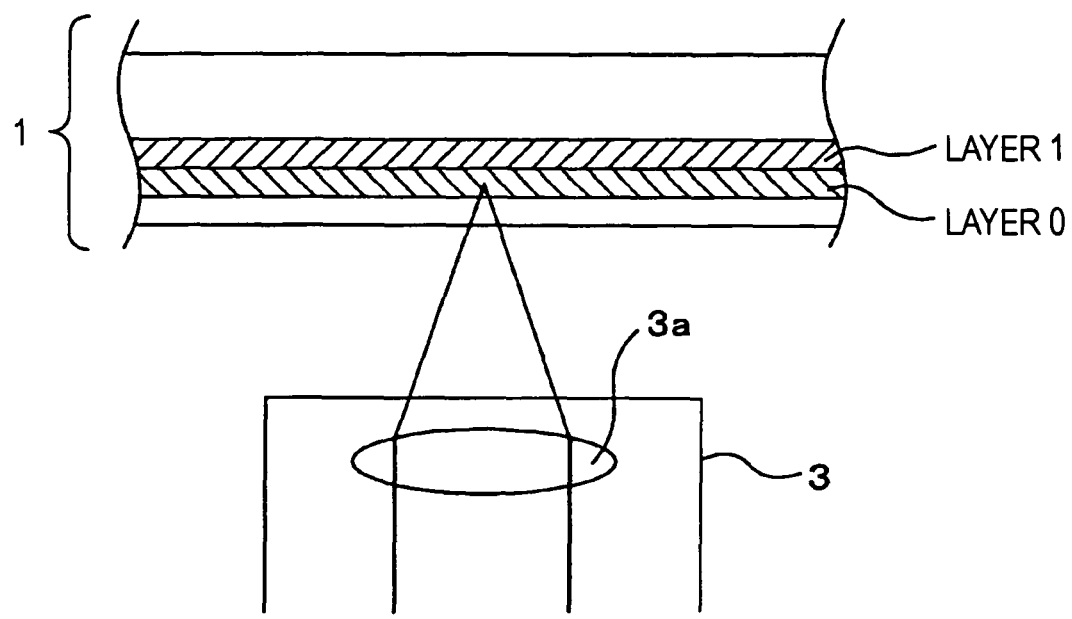
FIG. 1 is a sectional view illustrating a sectional structure of an optical disc recording medium according to an embodiment of the present invention.

FIG. 1 illustrates a sectional structure of a disc 1 which serves as an optical disc recording medium according to this embodiment.

The disc 1 can be a DVD (Digital Versatile Disc) which has multiple recording layers and is capable of having data rewritten thereon. More specifically, the disc 1 can be a multilayered DVD+RW disc which complies with the DVD+RW format.

For simplicity of the following description, it is assumed that the disc 1 is provided with two recording layers, i.e., a first recording layer (layer 0) and a second recording layer (layer 1).

In this embodiment, the two recording layers are formed of phase-change recording films. The disc 1 has a structure in which the two layers are laminated with relatively small spacing therebetween.

As shown in FIG. 1, the first recording layer is provided on the side closer to an objective lens 3a of an optical pickup 3 in a disc drive apparatus described below, and the second recording layer is provided on the other side farther from the objective lens 3a.

In a recording operation performed on such a dual-layer disc, laser light emitted from the optical pickup 3 is converged through the objective lens 3a onto either one of the recording layers, and a signal is recorded on the recording layer on which the laser light is converged.

Figure 2:
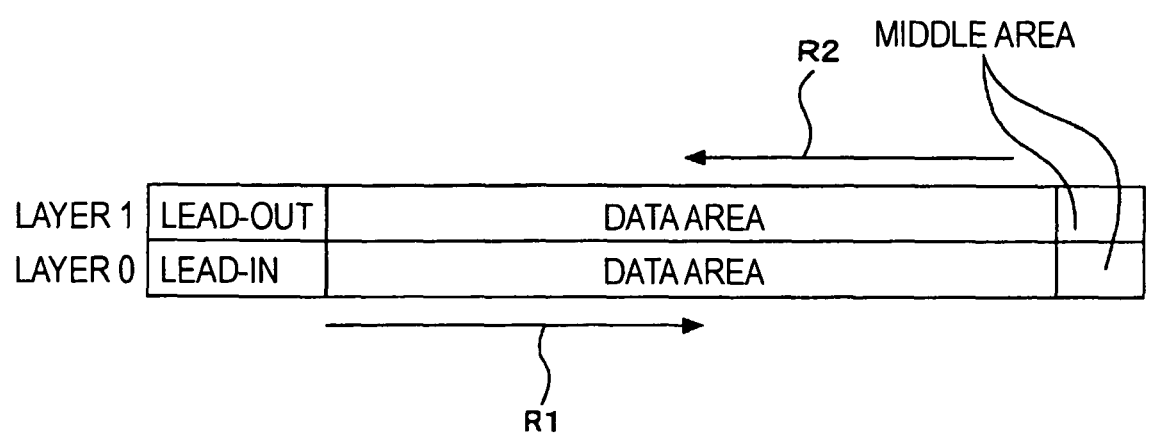
FIG. 2 illustrates an area structure of an optical disc recording medium according to an embodiment of the present invention.

Referring to FIG. 2, an area structure of the disc 1 is illustrated.

For the disc 1, in this case, an opposite track path system is used.

In this opposite track path system, as can be seen from R1 and R2 in the figure, the data is recorded sequentially from the inner radius side of the first recording layer toward the outer radius of the first recording layer and is then recorded from the outer radius side of the second recording layer toward the inner radius side of the second recording layer.

During this recording process, a lead-in area, a data area, and a middle area are formed in that order from the inner radius side to the outer radius side in the first recording layer where data recording begins. In the second recording layer, a middle area, a data area, and a lead-out area are formed in that order from the outer radius side to the inner radius side.

In the lead-in area, various types of information necessary for recording/reproduction on the disc 1 are to be recorded, such as medium type information and management information. In the data area, user data is to be recorded.

The middle area is to be added at a region radially more distant than the interlayer transition portion. Such a middle area is necessary for the opposite track path system: since a reproduction-only apparatus reads pits recorded on a disc surface and therefore can neither perform servo operation nor read data with stability in a region where no pit is provided, an area is necessary that serves as a guard, where, for example, dummy data is recorded.

The lead-out area likewise has a function as a guard, where, for example, dummy data is recorded.

Figure 3:
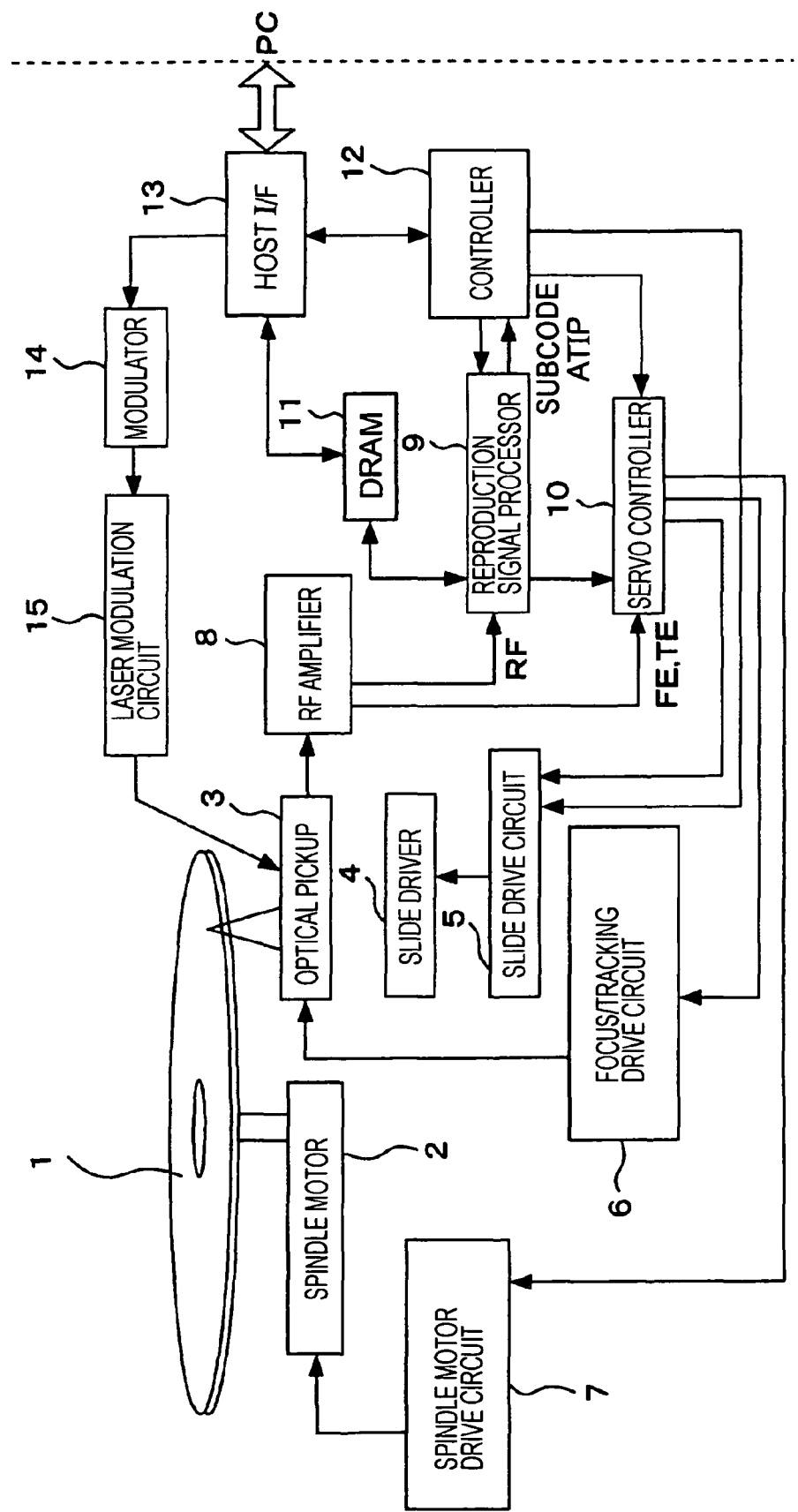
FIG. 3 is a block diagram illustrating an internal configuration of an optical disc drive apparatus according to an embodiment of the present invention.

FIG. 3 is a block diagram illustrating an inner configuration of a disc drive apparatus which serves as a recording apparatus according to the present embodiment for performing recording on the disc 1.

The disc drive apparatus in the present embodiment, which serves as the recording apparatus compatible with the disc 1 which is a DVD+RW disc, is configured to perform a formatting process known as background formatting.

This background formatting is a formatting technique in which, recording of dummy data is automatically performed on the data area of the disc 1, while no writing or reading operation for the disc 1 is being performed in the disc drive apparatus, i.e., idling state. Such dummy data recording is necessary to enable the disc 1 to be played back on a reproduction-only apparatus.

In addition, in this background formatting, a lead-out (middle area) is added at the end of a region where user data has been recorded. This allows the disc 1 to be played back on a reproduction-only apparatus, even when so-called finalizing, in which the disc 1 is fully formatted so as to be compatible with a reproduction-only apparatus, is not executed.

These operations mentioned above are well known, and therefore the description thereof will be omitted.

The disc drive apparatus according to the present embodiment is configured as a so-called multi-drive apparatus capable of performing recording and/or reproducing not only on the disc 1 which is a DVD+RW disc, but also on other types of DVD discs such as DVD-ROM, DVD-R, DVD+R, and DVD-RW discs.

Referring back to FIG. 3, the disc 1 or another DVD disc is placed on a turn table (not shown) and is driven to rotate at a constant linear velocity (CLV) or a constant angular velocity (CAV) by a spindle motor 2 during a recording/reproducing operation. The optical pickup 3 reads data recorded on the disc 1 in the form of embossed pits, dye-change pits, or phase-change pits.

The optical pickup 3 includes a laser diode that serves as a laser light source, a photodetector for detecting reflected light, an objective lens that serves as the output end of laser light, an optical system, and a two-axis mechanism. The optical system irradiates laser light onto a recording surface of the disc through the objective lens and guides light reflected from the disc recording surface to the photodetector. The two-axis mechanism holds the objective lens so that the objective lens can move in a tracking direction and a focus direction.

The entire optical pickup 3 can be moved by a slide driver 4 in the disc radial direction.

Light information reflected from the disc is detected by the photodetector and is converted into an electrical signal corresponding to the quantity of the received light. The converted electronic signal is supplied to an RF amplifier 8.

The RF amplifier 8 includes a current-voltage conversion circuit, a matrix-calculation/amplification circuit, etc. so as to correspond to a current output from the photodetector in the optical pickup 3. The RF amplifier 8 performs matrix-calculation processing to generate necessary signals including an RF signal that serves as reproduction data, a focus error signal FE for servo control, and a tracking error signal TE.

The RF amplifier 8 supplies the reproduction signal RF to a reproduction signal processor 9 and also supplies the focus error signal FE and the tracking error signal TE to a servo controller 10.

In the reproduction signal processor 9, the reproduction signal RF provided by the RF amplifier 8 undergoes processing such as binarization, PLL clock generation, decoding processing for EFM plus signal (an eight to sixteen modulation signal), and error correction processing.

The reproduction signal processor 9 performs decode processing and error correction processing using a DRAM (Dynamic Random Access Memory) 11. The DRAM 11 is used as a memory for storing data obtained via a host interface 13 and is also used as a cache for transferring data to a host computer.

The reproduction signal processor 9 then accumulates decoded data in the DRAM 11 that serves as the cache memory.

Data buffered in the DRAM 11 is read, transferred, and output as a reproduction output of the disc drive apparatus.

Out of information obtained by performing EFM plus demodulation and error correction operations on the RF signal, the reproduction signal processor 9 extracts information such as subcode information, ATIP information, LPP information, ADIP information and supplies the extracted information to a controller 12.

The controller 12 is implemented by, for example, a micro computer to control entire apparatus. Particularly in this case, the background formatting described above is conducted in accordance with control performed by the controller 12. More specifically, in response to an idling state in which no writing or reading operation on the disc is in progress, the controller 12 controls components necessary to carry out recording of dummy data. For example, the controller 12 causes a modulator 14 to generate modulation data of dummy data (for example, all "0" data) and performs access execution control on the servo controller 10, so as to carry out the recording operation.

In background formatting, the controller 12 is configured to perform recording of dummy data in units of predetermined recording blocks BFs, each of which serves as a smallest recording unit. In this case, the smallest recording unit used for the dummy data recording can be an ECC (Error Correcting Code) block (16 sectors).

The recording of dummy data in this case is performed in accordance with a predetermined recording sequence. Specifically, the controller 12 is configured to comply with information stored in, for example, a ROM contained therein which indicates a recording sequence of dummy data for the disc 1, thereby carrying out the dummy data recording in the predetermined sequence appropriately.

The host interface 13 is connected to external host equipment, such as a personal computer, and transfers reproduction data, a read/write command, and so on to and from the host equipment.

Thus, reproduction data stored in the DRAM 11 is output and transferred to the host equipment via the host interface 13.

A read/write command, record data, and other signals that are transmitted from the host equipment are buffered in the DRAM 11 or are supplied to the controller 12 via the host interface 13.

The supply of such a write command and record data from the host equipment causes data recording on the disc 1 to be executed.

In data recording, the modulator 14 performs necessary processing on the record data buffered in the DRAM 11. The processing includes error-correction-code addition and EFM plus modulation.

Then, the modulated record data is supplied to a laser modulation circuit 15. In accordance with the record data, the laser modulation circuit 15 drives a semiconductor laser in the optical pickup 3 to cause laser light corresponding to the record data to be output, thereby writing data to the disc 1.

During the recording operation, the controller 12 performs control such that the optical pickup 3 irradiates laser light onto a recording area of the disc 1 at a recording power level.

When the disc 1 is a write-once disc that uses a dye-change film as a recording layer, irradiation of laser light at a recording power level causes a dye change, which brings about formation of pits.

When the disc 1 is a rewritable disc having a phase-change recording layer, a temperature increase caused by the laser light changes the crystal structure of the recording layer, resulting in formation of phase change pits. Thus, various types of data are recorded in accordance with the presence/absence of pits and with lengths of pits. When a region where pits have been formed is illuminated with laser light again, the crystal state that has changed during data recording returns to its original state. Consequently, the pits disappear and thus the data is erased.

The servo controller 10 generates various servo drive signals to execute a servo operation. The servo drive signals includes a focus drive signal and a tracking drive signal which are generated from a focus error signal FE and a tracking error signal supplied from the RF amplifier 8. The servo controller 10 also generates servo drive signals such as a slide drive signal and a spindle drive signal from a spindle error signal SPE, etc., supplied from the reproduction signal processor 9 or the controller 12.

Specifically, the servo controller 10 generates the focus drive signal and the tracking drive signal in accordance with the focus error signal FE and the tracking error signal TE, and supplies the generated drive signals to a focus/tracking drive circuit 6. The focus/tracking drive circuit 6 drives a focus coil and a tracking coil of the two-axis mechanism in the optical pickup 3. Thus, a tracking servo loop and a focus servo loop are formed by the optical pickup 3, the RF amplifier 8, the servo controller 10, the focus/tracking drive circuit 6, and the two-axis mechanism.

In order to turn on the focus servo, a focus search operation has to be executed first. The focus search operation is to detect a position at which an S-shaped curve of the focus error signal FE can be obtained while forcibly moving the objective lens with the focus servo being turned off. As is well known to those skilled in the art, a linear portion of an S-shaved curve of a focus error signal represents a range in which the position of the objective lens can be brought into a focus position by closing the focus servo loop. Thus, the focus search operation is performed by detecting the focus position range while forcibly moving the objective lens and by turning on the focus servo at a timing based on the detection. This focus servo operation enables a laser spot to be kept in a focus state.

In the case of the present embodiment, the disc 1 may have a dual-layer structure composed of the first recording layer (layer 0) and the second recording layer (layer 1), as described above.

It can be taken into account that when a recording/reproducing operation is performed on the first recording layer, the laser light must be focused on the first recording layer. Similarly, when a recording/reproducing operation is performed on the second recording layer, the laser light must be focused on the second recording layer.

Such shifting of the focus position between the first recording layer and the second recording layer is performed by a focus jump operation.

When the laser light is focused on one layer, the focus jump operation is executed by turning off the focus servo to forcibly move the objective lens and by turning on the focus servo at a point when the objective lens reaches a position within the focus position range of the other layer (i.e., at a point when an S-shaped curve is observed).

Moreover, the servo controller 10 supplies a spindle drive signal, which is generated in accordance with the spindle error signal SPE, to a spindle-motor drive circuit 7. In response to the spindle drive signal, the spindle-motor drive circuit 7 supplies, for example, a three-phase drive signal to the spindle motor 2, thereby driving rotation of the spindle motor 2. The servo controller 10 also generates a spindle drive signal in response to a spindle kick/brake control signal fed from the controller 12, thereby causing the spindle-motor drive circuit 7 to execute operations, such as the start, stop, acceleration, and deceleration of the spindle motor 2.

Furthermore, the servo controller 10 generates a slide error signal, which is obtained as a low frequency component of the tracking error signal TE, and also generates a slide drive signal in accordance with an access execution control signal etc. fed from the controller 12. The servo controller 10 then supplies the generated signals to a slide drive circuit 5. The slide drive circuit 5 drives the slide driver 4 in response to the slide drive signal. The slide driver 4 has a mechanism (not shown) constituted by, for example, a sled motor, transmission gears, and a main shaft for holding the optical pickup 3. In response to the slide drive signal, the slide drive circuit 5 drives the slide driver 4 to perform necessary slide movement of the optical pickup 3.

In this embodiment, a case is illustrated where the disc drive apparatus is an external drive apparatus which is independent from host equipment (an information processing apparatus) such as a personal computer. However, the disc drive apparatus can be a built-in disc drive apparatus which is contained in such an information processing apparatus.

In addition, in this case, the disc drive apparatus is configured to be compatible only with DVD discs. However, the disc drive apparatus can also be configured to operate for other types of optical disc recording medium such as CDs (Compact Discs).

In background formatting for currently available DVD+RW discs which have only one recording layer, recording of dummy data is configured to be performed sequentially from the inner radius side, which is in accordance with the recording sequence of user data.

Therefore, it can be proposed that such a known background formatting technique be applied to the disc 1 of an embodiment of the present invention which is a DVD+RW disc having multiple recording layers.

Figures 4, 5A, 5B:
FIG. 4 illustrates an operation performed when a known background formatting technique is applied to a multilayered disc.

FIG. 4 illustrates a case where background formatting is performed on the disc 1 sequentially starting from the inner radius side of the first recording layer, as in the case of the known technique.

Similarly to FIG. 2 described above, the disc 1 is illustrated by way of its area structure.

In the case shown in FIG. 4, a user data block UD 1 is recorded only at the innermost region of the data area in the first recording layer, and then, during an idling state of the drive, background formatting is performed on blocks BF 1, BF 2, and BF 3.

Under this condition as illustrated in FIG. 4, it is assumed that recording of another user data block UD 2 is instructed, and then the UD 2 is recorded over an area larger than those of the BF 1 to BF 3 which immediately follows the user data block UD 1. In other words, a case is assumed where an area on which the background formatting has been performed (blocks BF 1 to BF 3) is overwritten with the user data block UD 2.

Further, a case is assumed that after the recording of the user data block UD 2 is completed, as illustrated in FIG. 5A, a request for disc ejection accompanied by a request for the disc to be made compatible with reproduction-only apparatuses is made.

In response to this request, as shown in FIG. 5B, a temporary middle area is to be added at a region radially more distant than the end position of the recorded user data block UD 2. More specifically, in this case, recording of user data is discontinued at some position in the track of the first recording layer. The position at which the recording is discontinued serves as the interlayer transition position and thus is to be immediately followed by a middle area at the position radially more distant from the end position, as shown in FIG. 5B. The function of this temporary middle area itself is similar to that of a known middle area.

Under this condition, recording of dummy data (formatting) is also to be performed on the second recording layer at a position radially less distant than the end position of the recorded user data block (i.e., the end position of the user data block UD 2), as shown in FIG. 5B as F-new.

Thus, on the second recording layer, the region is formatted which is radially less distant than the end of the region in the first recording layer where a user data block has been recorded. This, in conjunction with addition of temporary middle area, allows the disc 1 to be played back on a reproduction-only apparatus, even when so-called finalizing, in which the disc 1 is fully formatted, is not performed.

As described above, for the disc 1 having multiple recording layers, recording of dummy data (formatting) has to be performed on the second recording layer, every time reproduction compatibility is requested in a recording stage where only part of data area has been recorded with user data.

Therefore, when the known background formatting technique is applied to such a multilayered disc by following the recording sequence of user data, formatting of the second recording layer is arranged to be conducted at the end of a recording session. This results in an inefficient use of a background-formatted region.

In view of the foregoing circumstance, in the present embodiment, background formatting is configured to be performed preferentially starting from a recording layer intended for the final recording operation of user data.

Specifically, in such a recording layer intended for the final user data recording operation, background formatting is performed in the sequence opposite to that in which user data recording is performed. In this case, background formatting begins with a block BF located at the innermost radius side of the data area of the second recording layer and proceeds sequentially toward the outer radius side.

Thus, background formatting in this case is performed in the sequence completely opposite to that in which user data is recorded.

Figures 6, 7A, 7B:
FIG. 6 illustrates an operation performed when a background formatting technique according to an embodiment of the present invention is employed.
Figure 11:
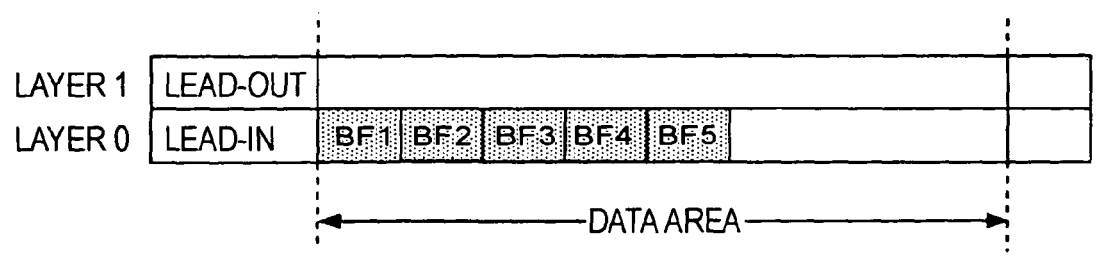
FIG. 11 illustrates an operation performed when a known background formatting technique is applied to a multilayered disc.
Figure 12A:
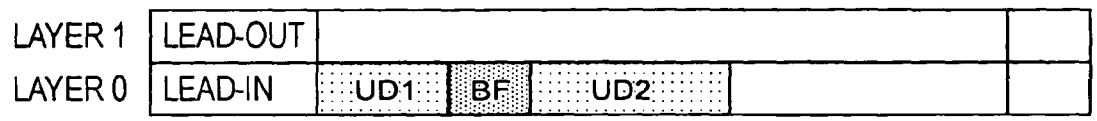
FIG. 12 also illustrates an operation performed when a known background formatting technique is applied to a multilayered disc.
Figure 12B:
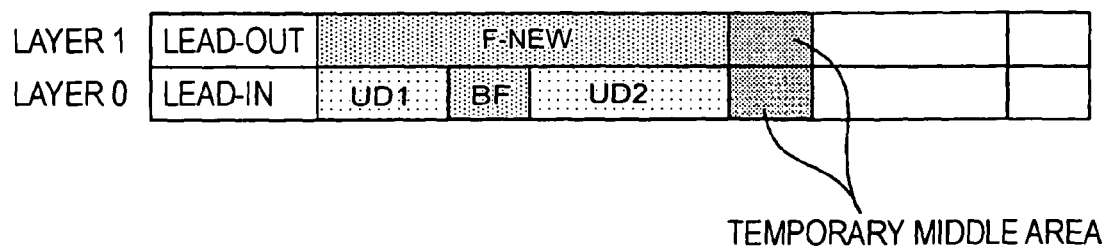

FIG. 6 illustrates a case in which a background formatting process according to the present embodiment is performed after the user data block UD 1 similar to that in FIG. 4 is recorded. Each of FIG. 6, FIG. 7A and FIG. 7B illustrates an area structure of the disc 1.

Similarly to the case illustrated in FIG. 4, it is assumed that background formatting has been performed on the three blocks BF 1, BF 2, and BF 3, and then, the use data block UD 2 similar to that shown in FIG. 5A is recorded on the first recording layer, resulting in a condition shown in FIG. 7A.

In this case, it can be found from FIG. 7A that the region on which background formatting has been performed is not overwritten with user data and that the background-formatted region advantageously remains in the data area.

Thus, a formatting operation in conjunction with addition of middle area, which is necessary to comply with a request for disc ejection accompanied by a request for reproduction compatibility, has to be performed only on a region as illustrated as F-new which is smaller than that in the case shown in FIG. 5B.

Thus, the background formatting is performed preferentially from the recording layer intended for the final user data recording operation. This enables the background formatted region to be utilized efficiently, which can shorten the time necessary for the formatting operation for disc ejection.

In addition, as shown in the above example, the background formatting is performed in the sequence opposite to that in which user data is recorded. This reduces the possibility that the background formatted region is overwritten with user data, thereby ensuring the reduction of the time necessary for the formatting operation for disc ejection.

For this background formatting process, as described above, the controller 12 is configured to recognize the sequence of blocks BFs to be background-formatted, on the basis of recording sequence information stored therein. Therefore, information stored in the controller 12 in this case indicates the recording sequence of blocks BFs in the opposite manner to information indicating the recording sequence of user data blocks UDs, so that the background formatting according to the present embodiment described above can be implemented.

In the foregoing, the case is described by way of example in which the disc 1 is a dual-layer disc. However, even when the disc 1 has three or more recording layers, the formatting time for disc ejection can similarly be shortened by performing background formatting preferentially from the recording layer intended for the final user data recording operation.

Moreover, in the present embodiment, as an example of background formatting performed preferentially starting from the recording layer intended for the final user data recording operation, the case is illustrated where background formatting is performed in the sequence opposite to that in which use data is recorded. Accordingly, the background formatting in this example is performed sequentially from the innermost radius side of the second recording layer. Thus, for a disc using an opposite track path, when the recording layer intended for the final user data recording operation is an even-numbered layer, performing background formatting sequentially from the innermost radius side permits reduction of formatting time for disc ejection with increased certainty.

On the other hand, when the recording layer intended for the final user data recording is an odd-numbered layer, user data recording performed on the odd-numbered layer is conducted in the same direction as user data recording performed on the first recording layer. Therefore, background formatting can be performed sequentially from the outermost radius side so that reduction of the formatting time for disc ejection can be ensured.

As another example of background formatting which is performed preferentially starting from the recording layer intended for the final user data recording, a modification as illustrated in FIG. 8 can also be employed.

Specifically, as shown in FIG. 8, background formatting is performed in units of blocks in the following sequence: a block BF 1 at the innermost radius side of the data area of the second recording layer; a block BF 2 at the innermost radius side of the first recording layer; a block BF 3 adjacent to the block BF 1 in the second recording layer; a block BF 4 adjacent to the block BF 2 in the first recording layer; a block BF 5 adjacent to the block BF 3 in the second recording layer; a block BF 6 adjacent to the block BF 4 in the first recording layer; and so forth.

As described above, in this example, background formatting is alternately performed on the second recording layer and the first recording layer, indicating that background formatting is performed preferentially starting from the recording layer intended for the final user data recording, similarly to the cases described above. Therefore, this enables the background formatted region to be utilized more efficiently compared with the known background formatting described above. Consequently, formatting time for disc ejection can advantageously be shortened.

In addition, when the number N of recording layers is two or more, in this modification, a background formatting process can be performed on the individual blocks at the innermost radius side of each recording layer in that order from the Nth recording layer to the first recording layer. Then, the background formatting process can similarly proceed sequentially from the Nth recording layer to the first recording layer for each block adjacent to the formatted block in each recording layer.

In the present embodiment, the case is described in which the disc 1 uses an opposite track path. However, also in a case where the disc 1 uses a parallel track path in which each recording layer has the same recording direction, background formatting can similarly be performed preferentially starting from the recording layer intended for the final user data recording operation, so that disc formatting time for disc ejection can be reduced.

Since, also in this case, the user data recording sequence of the recording layer intended for the final user data recording operation is the same as that of the first recording layer, background formatting is to be performed sequentially not from the innermost radius side but from the outermost radius side of the recording layers intended for the final user data recording operation. This also enables formatting time for disc ejection to be shortened with increased certainty.

While the description of the present embodiments are made in conjunction with a DVD+RW disc, the present invention can be used in a desirable manner for other media such as a DVD-RW disc and a CD-RW disc as long as they are capable of having data rewritten thereon and meet specifications for background formatting.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus for performing recording on an optical disc recording medium having at least two rewritable recording layers, the recording apparatus comprising:
    recording means for performing data recording on each rewritable recording layer of the recording medium; and
    recording controlling means for causing the recording means to record, during background recording, dummy data on a second layer of the at least two rewritable recording layers beginning at an edge of a lead-out area and proceeding in a sequential direction away from the lead-out area, the sequential direction being opposite to a sequential direction in which user data is recorded in the second layer, the controlling means causing the recording means to record user data beginning on a first of the at least two rewritable recording layers during non-background recording.

2. The recording apparatus of claim 1, wherein said optical disc recording medium is a DVD-RW disc.

3. The recording apparatus of claim 1, wherein said dummy data is recorded alternately on different recording layers in units of blocks.

4. The recording apparatus of claim 1, wherein a direction in which user data is recorded in the second layer is opposite to a direction in which user data is recorded in the first layer.

5. A recording method for a recording apparatus for performing recording on an optical disc recording medium having at least two rewritable recording layers, comprising:
    recording, during background recording, dummy data on a second layer of the at least two rewritable recording layers beginning at an edge of a lead-out area and proceeding in a sequential direction away from the lead-out area, the sequential direction being opposite to a sequential direction in which user data is recorded in the second layer; and
    recording user data beginning on a first of the at least two rewritable recording layers during non-background recording.

6. The recording method of claim 5, wherein said dummy data is recorded alternately on different recording layers in units of blocks.

7. A recording apparatus performing recording on an optical disc recording medium having at least two rewritable recording layers, the recording apparatus comprising:
    a recording unit to perform data recording on each recording layer of the recording medium; and
    a recording controller to cause the recording unit to record, during background recording, dummy data on a second layer of the at least two rewritable recording layers beginning at an edge of a lead-out area and proceeding in a sequential direction away from the lead-out area, the sequential direction being opposite to a sequential direction in which user data is recorded in the second layer, the recording controller causing the recording unit to record user data beginning on a first of the at least two rewritable recording layers during non-background recording.

8. The recording apparatus performing recording on an optical disc recording medium of claim 7, wherein said dummy data is recorded alternately on different recording layers in units of blocks.

* * * * *